US 6,677,494 B2

(12) United States Patent
Brunet et al.

(10) Patent No.: US 6,677,494 B2
(45) Date of Patent: Jan. 13, 2004

(54) PROCESS AND DEVICE FOR THE PRODUCTION OF AROMATIC COMPOUNDS INCLUDING A REDUCTION OF THE CATALYST

(75) Inventors: Francois-Xavier Brunet, Istres (FR); Olivier Clause, Chatou (FR); Jean-Marie Deves, Vernouillet (FR); Eric Sanchez, Rueil Malmaison (FR); Frederic Hoffmann, Paris (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 135 days.

(21) Appl. No.: 09/725,931

(22) Filed: Nov. 30, 2000

(65) Prior Publication Data

US 2001/0041816 A1 Nov. 15, 2001

(30) Foreign Application Priority Data

Nov. 30, 1999 (FR) .............................. 99 15228

(51) Int. Cl.[7] .......................... C07C 15/02; C07C 5/36; C07C 5/32
(52) U.S. Cl. ...................... 585/430; 585/431; 585/433
(58) Field of Search ................................. 585/430, 431, 585/433

(56) References Cited

U.S. PATENT DOCUMENTS 3,761,390 A * 9/1973 Greenwood et al. ........ 208/139
3,992,465 A * 11/1976 Juguin et al. ............... 208/102

FOREIGN PATENT DOCUMENTS

FR 2 657 087 7/1991

OTHER PUBLICATIONS

French Search Report dated Aug. 16, 2000.

* cited by examiner

Primary Examiner—Thuan D. Dang
(74) Attorney, Agent, or Firm—Millen, White, Zelano & Branigan, P.C.

(57) ABSTRACT

The invention relates to a process for the production of aromatic compounds from a hydrocarbon fraction with a catalyst the preferably circulates in a moving bed. In the process, a hydrocarbon feedstock that is treated by a hydrogen-rich gas is transformed. In a particular embodiment, regenerative reforming is conducted, such as for production of BTX (butene, toluene, xylenes) with continuous regeneration of the catalyst. The invention also pertains to the related device for carrying out the process.

9 Claims, 2 Drawing Sheets

Figure 1:
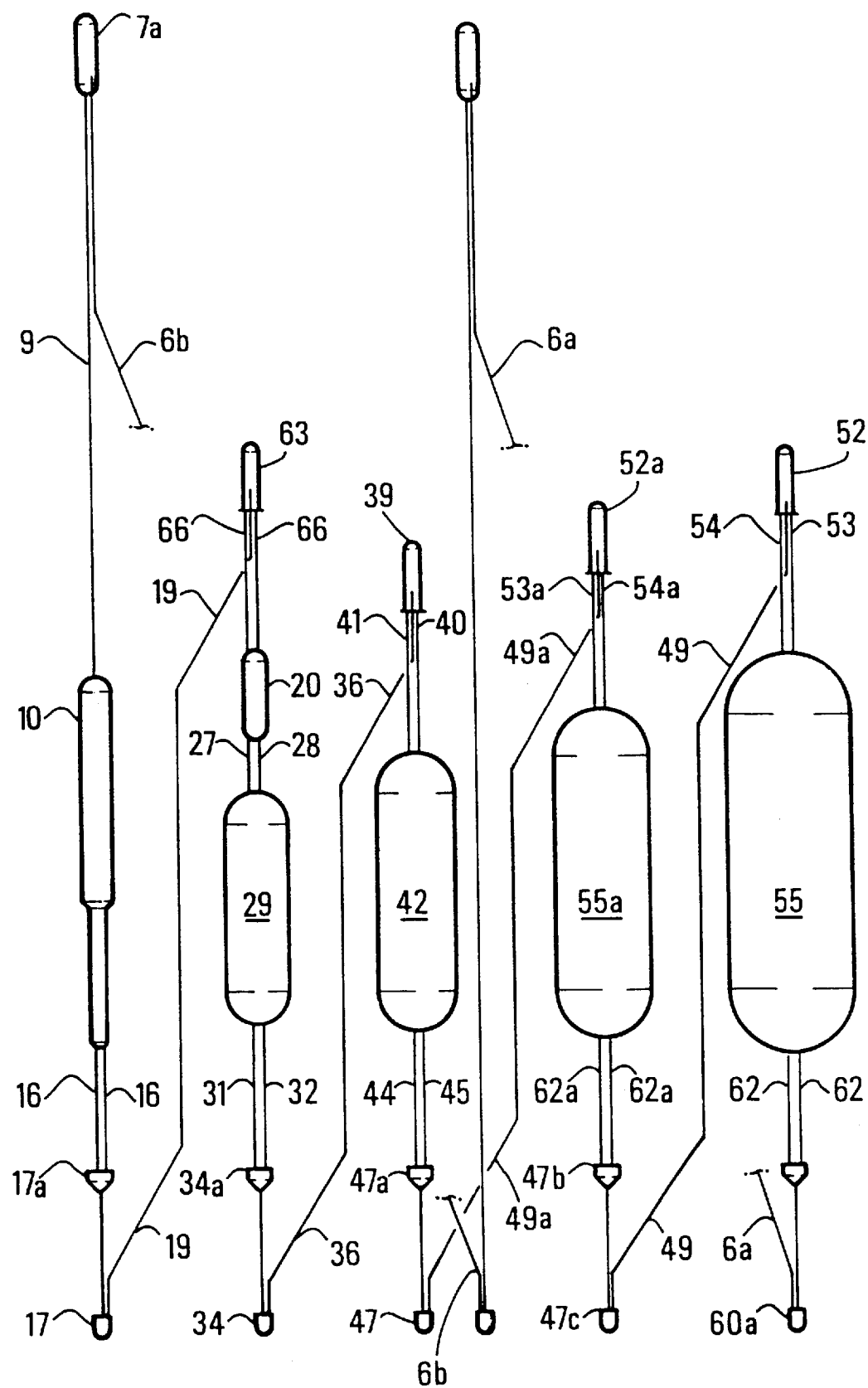

PROCESS AND DEVICE FOR THE PRODUCTION OF AROMATIC COMPOUNDS INCLUDING A REDUCTION OF THE CATALYST

The invention relates to the processes (preferably in a moving bed) for the production from hydrocarbons of aromatic compounds, in which a hydrocarbon feedstock that is treated by a hydrogen-rich gas is transformed. It pertains more specifically to the regenerative reforming or to the more specific production of BTX (butene, toluene, xylenes) with continuous regeneration of the catalyst.

It relates more particularly to the stage of reduction of the catalyst and optionally also to the first reactor in which the reactions for dehydrogenation of the naphthenes that are contained in the feedstock for the most part take place.

The catalyst generally comprises a substrate (for example formed by at least one refractory oxide; the substrate can also include one or more zeolites), at least one noble metal (preferably platinum), and preferably at least one promoter metal (for example tin or rhenium), at least one halogen and optionally one or more additional elements (such as alkalines, alkaline-earths, lanthanides, silicon, elements of group IV B, non-noble metals, elements of group III A, etc.). The catalysts of this type contain, for example, platinum and at least one other metal deposited on a chlorinated alumina substrate. In a general way, these catalysts are used for the conversion of naphthenic or paraffinic hydrocarbons that can be transformed by dehydrocyclization and/or dehydrogenation, in reforming or for the production of aromatic hydrocarbons (for example production of benzene, toluene, ortho-, meta- or paraxylenes). These hydrocarbons are obtained from the fractionation of crude petroleums by distillation or other transformation processes such as catalytic cracking or steam-cracking.

These catalysts are extensively described in the literature.

The chemical reactions that are involved in the reforming process are numerous. They are well known; for the reactions that are beneficial to the formation of aromatic compounds and to the improvement of the octane number, it is possible to cite the dehydrogenation of naphthenes, the isomerization of cyclopentanoic cycles, the isomerization of paraffins, and the dehydrocyclization of paraffins; and for the harmful reactions, it is possible to cite hydrogenolysis and hydrocracking of paraffins and naphthenes. These various reactions have very different speeds and are strongly endothermic for the dehydrogenation reactions, exothermic for the other reactions. This is why the reforming process takes place in several reactors that undergo more or less significant temperature drops.

Experience shows that the dehydrogenation reactions of naphthenes occur in the first reactor or reactors.

The processes for reforming or for production of aromatic compounds were carried out at 40 bar 30 years ago; at 15 bar 20 years ago, and today, it is common to see reforming reactors that operate at pressures of less than 10 bar, in particular between 3 and 8 bar.

This drop in hydrogen pressure, however, is accompanied by a faster deactivation of the catalyst by coking. The coke that consists of a high molecular weight and a primarily carbon and hydrogen base is deposited on the active sites of the catalyst. The H/C molar ratio of the coke that is formed varies from about 0.3 to 1.0. The carbon and hydrogen atoms form condensed polyaromatic structures whose percentage of crystalline organization is variable based on the nature of the catalyst and operating conditions of the reactors.

Although the selectivity of transformation of the hydrocarbons into coke is very low, the contents of coke accumulated in the catalyst can be significant. Typically, for the fixed-bed units, these contents are between 2.0 and 20.0 to 25.5% by weight. For the circulating-bed units, these contents are spread from 3.0 to 10.0% by weight at the outlet of the last reactor. The coke is deposited for the most part in the last two reactors.

The coke deposition, faster at low pressure, also imposes a faster regeneration of the catalyst. The current regeneration cycles can drop up to 2–3 days.

Numerous patents deal with the processes for reforming or for production of aromatic compounds with continuous or sequential regeneration of the catalyst. The diagrams of processes use at least two reactors, in which a catalytic moving bed, through which passes a feedstock that consists of hydrocarbons and hydrogen, a feedstock that is reheated between each reactor, circulates from top to bottom.

Experience shows that the first reactor is the center of highly productive and fast hydrogen reactions.

Patent FR-2,657,087 of the applicant describes such a reforming process.

In FIG. 1 that is reproduced here (corresponding to FIG. 2 of Patent FR-2,657,087), four reactors are used. An initial feedstock that consists of hydrocarbons and hydrogen is circulated through at least two reaction zones that are placed in series, side by side, whereby each of these reaction zones is of moving-bed type, the feedstock circulates successively in each reaction zone, and the catalyst also circulates in each reaction zone by flowing continuously, in the form of a moving bed, from top to bottom of each of them, whereby the catalyst that is drawn off at the bottom of each reaction zone is transported in a hydrogen stream to the top of the next reaction zone, and whereby the catalyst, continuously drawn off from the bottom of the last reaction zone through which the feedstock passes, is then sent into a regeneration zone.

In referring to FIG. 1, the feedstock that consists of hydrocarbons and hydrogen, according to a well-defined H2/HC ratio, passes through reactor 1 (29), is reheated, passes through reactor 2 (42), is reheated, passes through reactor 3 (55a), is reheated, passes through reactor 4 (55) and is sent to a separation section.

The catalyst drops into reactor 1 (29) by the feedstock passing through it, the catalyst is drawn off from (29) via pipes (31) and (32), is collected again in a hopper (34a), and is raised to upper buffer flask (39) of reactor 2 via a lifting means (34) and (36); it flows from this buffer flask (39) via pipes (40) and (41) to reactor 2 (42); it is drawn off from (42) by pipes (44) and (45), is collected again in a hopper (47a), and is raised to upper buffer flask (52a) of reactor 3 via a lifting means (47) and (49a); it flows from this buffer flask (52a) via pipes (53a) and (54a) to reactor 3 (55a); it is drawn off from (55a) by pipes (62a), is collected again in a hopper (47b), and is raised to upper buffer flask (52) of reactor 4 via a lifting means (47c) and (49); it flows from this buffer flask (52) via pipes (53) and (54) to reactor 4 (55); it is drawn off from (55) via pipes (62), is collected again in a hopper, and is raised to upper buffer flask (7a) of regenerator (10) via a lifting means (60a), (6a) and (6b); it flows from this buffer flask (7a) via a pipe (9) to regenerator (10); it is drawn off from (10) via pipes (16), is collected again in a hopper (17a), and is raised to upper buffer flask (63) of reactor 1 via a lifting means (17) and (19); it flows from this buffer flask (63) via pipes (66) to a reduction flask (20), where the catalyst at least partially regains its metallic form; finally, it flows via pipes (27) and (28) to reactor 1 (29).

The treatment of the feedstock in the reactor(s) for reforming or production of aromatic compounds generally takes place under pressures of 0.1 to 4 MPa and preferably 0.3–0.8 MPa, 400–700° C. and preferably 480–600° C., volumetric flow rates from 0.1 to 10 $h^{-1}$ and preferably 1–4 $h^{-1}$ and with recycled hydrogen/hydrocarbon ratios (mol.) of 0.1 to 10 and preferably 3–10, and more particularly 3–4 for regenerative reforming and 4–6 for the process for the production of aromatic compounds.

Traditionally, a first separation is carried out after the last reactor, between the hydrocarbons and a recycling hydrogen that is reinjected into the fresh feedstock.

The non-recycled effluent undergoes a separation process that makes it possible to obtain a so-called exported hydrogen, which can contain up to 10% by volume, or at best 4% by volume, of light hydrocarbons such as ethane and propane. In comparison, the recycling hydrogen can contain more than 10%, generally more than 12% or 15% by volume of C2+, C2H4 to C10 aromatic compounds.

The coked catalysts are regenerated.

Generally, the regeneration of the catalyst is carried out mainly in three stages:

(a) a combustion stage where the coke is eliminated by burning with a gas that contains oxygen, (b) a halogenation stage where the catalyst is flushed by a halogenated gas, which makes it possible to reintroduce the halogen in the catalyst and to redisperse the metallic phase, (c) a stage for drying or calcination that eliminates from the catalyst the water that is produced by the combustion of the coke.

It is completed by a reduction stage where the catalyst is reduced prior to the introduction of the feedstock, which is generally carried out between the regenerator (where stages a, b, and c are used) and the first reactor where the reaction takes place.

The reduction consists of a chemical transformation of the metallic phase that is contained in the catalyst. At the end of the preparation of the catalyst or the calcination stage that the catalyst undergoes in regeneration, the metal or metals are present at the surface of the catalyst in oxide form, or oxychloride form, virtually catalytically inactive. Before the hydrocarbon feedstock that is to be treated is injected, it is therefore essential to initiate the reduction of the catalyst.

In practice, this reduction is carried out at a high temperature (between 300–800° C. and more generally 450 and 550° C.) in the presence of exported or purified hydrogen and for periods of generally between several minutes to several hours. Purified hydrogen is obtained from an exported hydrogen purification unit. It generally contains less than 1% by volume of C2+.

A purified or exported hydrogen gas was thus provided for the reduction, and said gas was then drawn off and lost, once the reduction operation ended, and a recycling (non-purified) hydrogen was provided for the reaction in a single H2/HC ratio for the reforming unit.

This invention proposes using the recycling hydrogen in reduction and optionally combining the reduction zone and the first reactor when the process operates with a catalytic moving bed. This arrangement makes it possible in particular to increase the amount of exported hydrogen—produced with high added value—that is available. The invention also makes it possible, if necessary, to make it unnecessary to purify the hydrogen that is obtained from the reforming process.

More specifically, the invention relates to a process for the production of aromatic compounds from the hydrocarbon fraction with a catalyst (preferably circulating in a moving bed), a process that comprises at least the following successive stages that take place in at least one zone: treatment of the fraction in the presence of hydrogen and implementing a reaction for dehydrogenation of naphthenes; separation of the gas effluent that contains hydrogen, the liquid product and the catalyst; regeneration of the catalyst; reduction of the catalyst and reintroduction of the catalyst for the treatment stage; and optionally preferably recycling in the treatment stage using dehydrogenation of at least a portion of the gas effluent that contains hydrogen that is called recycling gas; process in which the reduction stage is carried out in the presence of recycling gas that is introduced in an amount such that the amount of pure hydrogen that is provided is between 1–10 kg/kg of catalyst, whereby the gas effluent that is obtained from the reduction is then separated from the catalytic bed.

The invention thus proposes an additional stage to the process that consists of recycling in the reduction stage at least a portion of the gas effluent that contains hydrogen (called recycling gas) that was separated from the liquid and the catalyst.

Advantageously, in the treatment zone where the reaction for dehydrogenation of naphthenes takes place, the amount of recycling gas is such that the H2/HC molar ratio is at most 10, whereby H2 represents the amount that is expressed in moles of pure hydrogen provided to the zone of the treatment stage in which primarily the dehydrogenation reaction takes place, and whereby HC represents the amount, expressed in moles, of hydrocarbons in the fraction that enters said zone.

The reduction stage is generally carried out between 300–800° C., preferably between 400–600° C., whereby the dwell time of the catalyst is 15 minutes to 2 hours, and preferably 30 minutes to 1 hour and 30 minutes.

The process for the production of aromatic compounds (and more particularly the zone in which primarily the reaction for dehydrogenation of naphthenes is carried out) is conducted at 400–700° C., 0.1–4 MPa, with volumetric flow rates of 0.1–10 $h^{-1}$, and H2/HC molar ratios of 0.1 to 10.

Advantageously, the reforming is carried out under 0.3–0.8 MPa, at 480–600° C., with volumetric flow rates of 1–4 $h^{-1}$ and with preferred H2/HC ratios of at most 4, even at most 2, in the stage that implements the dehydrogenation.

A production of BTX aromatic compounds is advantageously carried out under 0.3–0.8 MPa, at 480–600° C., with volumetric flow rates of 1–4 $h^{-1}$ and with preferred H2/HC ratios of at most 6, even at most 3, in the stage that implements the dehydrogenation.

The treatment stage can be carried out in one or more zones; thus four treatment zones are used for the reforming shown in FIG. 1.

The invention therefore focuses on the reduction stage that is carried out in the catalyst and optionally in the first zone (or first reactor) of the treatment stage.

Figure 2:
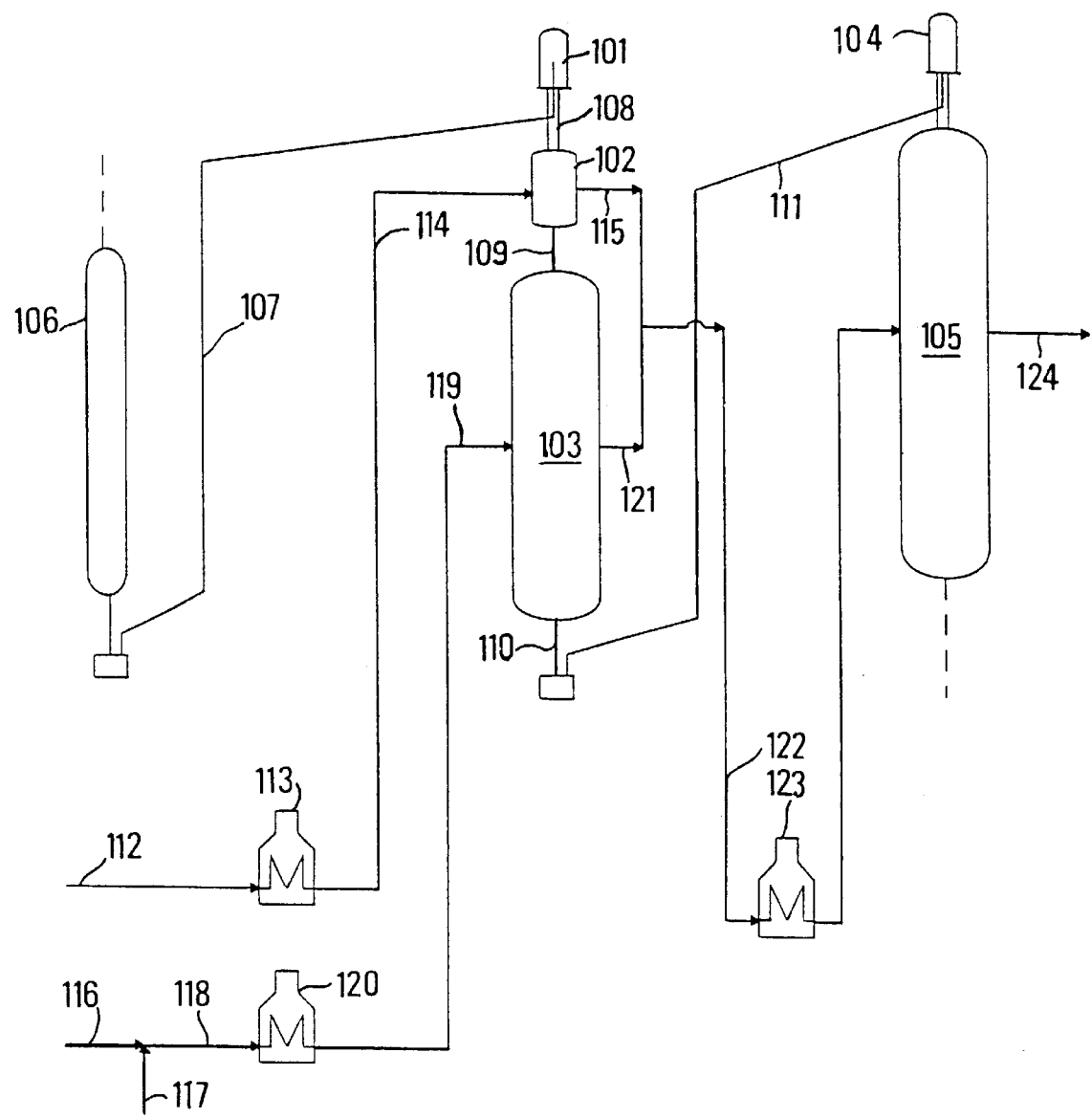

The invention will be better understood from FIG. 2.

The catalyst circulates from regenerator (106) to upper buffer flask (101) of first reactor (103) via a transfer means (107) that is, for example, an elevator or lift (107); it drops under the action of gravity via pipes (108) to reduction zone (102). This reduction zone can be axial or radial and can comprise one or more sections. The catalyst that leaves the reduction zone passes through pipe(s) (109) into first reactor (103), from which it is drawn off via pipes (110); it is then sent to upper buffer flask (104) of second reactor (105) via a transfer means (111), advantageously an elevator.

The gas that contains the hydrogen that is used for the reduction stage is provided via pipe (112). Advantageously, it is provided at the temperature of the reduction stage, by at least one heating means (113). Resulting flow (114) reduces the catalyst in chamber (102). A flow (115) emerges therefrom.

To the feedstock, conveyed via at least one pipe (116), is added a gas that contains hydrogen via at least one pipe (117), and the resulting flow enters via pipe (119) into the first reactor in which the dehydrogenation reactions of the naphthenes primarily take place.

$(H2)_1$ is the amount in moles of hydrogen (expressed in pure hydrogen) that is provided to first reactor (103) (whereby the optional hydrogen that is obtained from the reduction is excluded) via pipe (119)

$(H2)_{red}$ is the amount in moles of hydrogen (expressed in pure hydrogen) that is provided to reactor (102) via pipe (114)

$(H2)_2$ is the amount in moles of hydrogen (expressed in pure hydrogen) that is provided to reactor (105) in which the subsequent stage takes place (not comprising primarily the reactions for dehydrogenation of naphthenes)

(HC) the amount in moles of feedstock that enters the first reactor $(HC)_2$ the amount in moles of feedstock that enters the reactor of the subsequent stage (105).

In FIG. 2, $(HC)_2$ is equal to HC since the entire effluent of the first reactor is treated in the second reactor. It is possible to envisage the case where only a portion of the effluent of the first stage is treated in the subsequent stage, and the case where the feedstock is added to the effluent of the first stage before the reactor of the subsequent stage.

According to the process, the amount $(H2)_1$ is such that $$\frac{(H2)_1}{HC} \quad \frac{(H2)red}{HC} \leq \frac{(H2)_2}{(HC)_2}$$

In a general way, $$\frac{(H2)_1}{HC}$$

is at most 10, and preferably 0.1 to 10.

All of the amounts are expressed in moles.

The amount of hydrogen that is provided in the reduction stage (calculated in pure hydrogen) is selected such that the PPH relative to the catalyst is between 1 and 10 kg of hydrogen/kg of catalyst/h, preferably between 2 and 6 kg of hydrogen/kg of catalyst/h. The gas flow rate is adequate to eliminate the calories that are provided by optional cracking reactions of hydrocarbons into C2+ contained in the reduction gas.

The quality of the hydrogen is less critical than in the prior art. It thus is advantageously possible to use in reduction a gas that can contain large amounts of impurities, for example 15% by volume of C2+.

With regard to the first reactor (primarily dehydrogenation reactions of naphthenes), recycling hydrogen is very advantageously used, but purified hydrogen and exported hydrogen could be used although this solution is not very advantageous economically.

It will be noted that the H2/HC ratio that is expressed above is the ratio that is conventionally used in the treatment process and more particularly in the first zone. It is thus preferably 2–4 for the reforming and 3–6 for the production of aromatic compounds.

This means that the $(H2)_1$/HC ratio, in the zone of the treatment stage where the reaction for dehydrogenation of the naphthenes takes place, is less than the H2/HC ratio of the prior art when (FIG. 2) the hydrogen that is provided for the reduction is extracted from the reduction stage and does not pass into said zone (except the small portion that passes with the catalytic moving bed).

Thus, by using the process, it was possible to reduce the $(H2)_1$/HC ratio at said zone, and consequently the reaction for dehydrogenation of naphthenes is promoted.

Advantageously, flow (118) is brought to the reaction temperature of first reactor (103) by at least one heating means (120). Resulting flow (119) reacts in reactor (103) and provides an effluent (121).

Gas flows (115) and (121) are preferably mixed in a pipe (122) and constitute the feedstock of the following reactor (105), which is advantageously provided at the reaction temperature by at least one heating means (123). In this preferred arrangement, the mixture of hydrogen effluent for reduction with the effluent of the first reactor makes it possible to obtain an $(H2)_2/(HC)_2$ ratio at the inlet of the second reactor that can be higher than in the prior art, thus promoting the transformation of the hydrocarbons after dehydrogenation.

The gas effluents that are obtained from the reduction and the stage that implements the dehydrogenation thus are introduced into at least one stage following the dehydrogenation.

It is even possible to add recycling gas in said stage that follows the dehydrogenation.

More generally, at least a portion of the gas effluent that is obtained from the reduction can be introduced into the stage that implements the dehydrogenation and/or at least one stage following the dehydrogenation.

The effluent that leaves reactor (105) via pipe (124) is then treated according to the standard treatment process, for example, it is sent to a third treatment zone, it can be drawn off, etc . . . . The same holds true for the catalyst.

The invention therefore consists in reducing the supply of hydrogen via line (119) in the first zone of the treatment stage, if it is compared relative to the prior art, and in increasing the amount of hydrogen in the reduction stage. In all cases, the amount of hydrogen that is used in reduction is controlled.

This amount of hydrogen that is used in reduction can be modulated according to the needs of the user. It may correspond to maintaining the overall H2/HC ratio (reduction +1st reactor). It may result in a higher overall H2/HC ratio but while maintaining a hydrogen deficit in the first reactor. At the level of the second reactor (after predominant dehydrogenation of the naphthenes), this leads to maintaining the H2/HC ratio (relative to the prior art) or to increasing this ratio that promotes other reactions. An additional injection of hydrogen can also be made.

This leads to very important advantages:
(a) A significant flow rate of the hydrogen relative to the amount of catalyst in a reduction zone that limits the harmful thermal effects of hydrogenolysis and hydrocracking of C2+ hydrocarbons that are optionally present in the hydrogen that is used for the reduction, such that the process of the invention can operate with recycling hydrogen and without purification,
(b) the first reactor is essentially the center of dehydrogenation reactions of naphthenes (for the reforming units or production of aromatic compounds) that are highly productive in hydrogen; a reduction of the amount of hydrogen that is introduced into the feedstock of this first reactor promotes these dehydrogenation reactions that are faster. Despite these conditions that are more favorable to coking, it was noted that the coking does not have the time to develop in a sensitive manner relative to the prior situation.

For the user, the invention is reflected by significant gains that result from:

(a) The possibility of using a less pure hydrogen in reduction and of limiting the dwell time in the reduction zone, (b) the limiting of the dechlorination and the metallic sintering in the reduction zone and thus increasing the service life of the catalyst, (c) the optimization of the H2/HC ratio in the first reactor which makes it possible to reduce the amount of catalyst that is necessary in this first reactor for the dehydrogenation of naphthenes.

The invention also relates to a device for aromatic compound production that implements the process according to the invention.

Said device for production of aromatic compounds from a hydrocarbon fraction with a catalyst that circulates in a moving bed comprises:

at least one zone for the treatment of the fraction that implements a reaction for dehydrogenation of naphthenes, whereby said zone is equipped with at least one pipe for the introduction of the fraction, at least one pipe for drawing off said treated fraction, at least one pipe for the introduction of the catalyst at the top of said zone, and at least one pipe for the output of the catalyst and located at the bottom of said zone, whereby said zone also comprises at least one pipe for the introduction of a gas that contains hydrogen and also comprises at least one pipe for the extraction of a gas flow;

at least one zone for the separation of the catalyst, the liquid product and the gas effluent that contains hydrogen;

at least one zone for the regeneration of the catalyst;

at least one zone for the reduction of the regenerated catalyst connected to said zone that implements the dehydrogenation of naphthenes such that the reduced catalyst enters said dehydrogenation zone via said pipe for the introduction of the catalyst, whereby said reduction zone is equipped
with at least one pipe for the introduction of gas that contains hydrogen,
and at least one pipe for the extraction of a gas flow;

at least one pipe for the recycling of at least a portion of the gas effluent that contains hydrogen from said separation zone to said zone that implements the dehydrogenation reaction;

the device also comprises at least one pipe for the recycling of at least a portion of the gas effluent that contains hydrogen in the pipe for the introduction of gas into said reduction zone.

Advantageously, the device comprises at least one reaction zone that is located after said zone that implements the dehydrogenation reaction, whereby said reaction zone comprises at least one pipe for the input of catalyst and a pipe for its output, at least one pipe for the introduction of a gas that contains hydrogen and at least one pipe for the output of a gas effluent, and at least one pipe for the input of the reaction effluent that is obtained from the preceding zone and a pipe for the reaction effluent that is obtained from this zone, device in which the pipe for the introduction of a gas that contains hydrogen is connected to pipes for the extraction of gas flows that are obtained from the dehydrogenation zone and the reduction zone.

Advantageously, the pipe for the introduction of a gas that contains hydrogen is also connected to a pipe that provides the recycled gas effluent.

The following example illustrates the invention without limiting its scope.

The catalyst circulates at 800 kg/h, and 90,839 kg/h of feedstock is treated. The reduction is carried out with 18,294 kg/h of a hydrogen-rich gas with a purity of 83.7% by volume of hydrogen, with a molar mass of 9.6 kg/kmol, with a PPH of H2 of 4 $h^{-1}$, and a dwell time of the catalyst of 1 hour. In the first treatment zone (first reactor), 9,976 kg/h of hydrogen-rich gas with a purity of 83.7% by volume of hydrogen, a molar mass of 9.6 kg/kmol, is injected into the feedstock at 90,839 kg/h. An H2/HC ratio that is equal to 1.13 is then obtained.

In the prior art, for the same flow rate of feedstock and catalyst, a hydrogen recycling gas of molar mass 9.6 kg/kmol that contains 83.7% by volume of hydrogen at the flow rate of 28,270 kg/h was injected into the first reactor. All of the effluent passed into the second reactor. The resulting H2/HC molar ratio was equal to 3.2. The reduction was carried out with a rich gas with 92.1% by volume of hydrogen, a molar mass of 4.4 kg/kmol, under a flow rate of 600 kg/h, and for a dwell time of the catalyst of 2 hours.

It can be noted that with use of the process according to this invention, it is possible to use non-purified hydrogen, i.e., containing more than 10% by volume of impurities, and generally more than 15% by volume, both with regard to this reforming reactor and to the reducing reactor; and the flow rate of hydrogen-rich gas that is injected into the feedstock of the first reactor is reduced by the amount that is added in reduction.

These conditions can be adjusted.

Actually, in the case where an H2/HC ratio that is lower than 1.1 is desired, it will be necessary to inject the remaining hydrogen-rich gas (which then had not been injected into the feedstock that enters the first reactor) in the effluent of the first reactor before its input into the second reactor.

If a higher $(H2)_1$/HC ratio in the first reactor is desired, it is possible to reduce the flow rate of hydrogen H2 by reduction. Thus, with a PPH H2 in a reduction zone equal to 2 $h^{-1}$ for example, it then is possible to operate, under the conditions of the example, an $(H2)_1$/HC ratio that is equal to 1.4 in the first reactor.

It is possible to have a dwell time and a PPH H2 in reduction, and an H2/HC ratio in the first reactor, such that the case of the example is not applicable. It may be that the amounts of reduction hydrogen and injected hydrogen in the feedstock are not adequate to have a suitable H2/HC ratio at the inlet of the second reactor. In this case, it is possible to install an additional injection of hydrogen-rich gas in the effluents that leave from the first reactor, or at least in the feedstock of the second reactor.

The use in reduction of the recycling gas for a moving-bed process was described here. It may also relate to a fixed-bed process, however.

It will be noted that this use in a moving bed is very advantageously linked to the use of a reduced H2/HC ratio in the first reactor, but that all higher values of the H2/HC ratio in this reactor are possible, in particular those of the prior art.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/15.228, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing an aromatic compound from a hydrocarbon fraction that contains naphthenes with a catalyst in one or more catalytic beds, said process comprising at least the following successive stages: treating the hydrocarbon fraction in the presence of hydrogen and implementing a reaction to dehydrogenate naphthenes; separating a gas effluent that contains hydrogen to form recycling gas, liquid and catalyst; regenerating the catalyst; reducing the catalyst and reintroducing the catalyst to the one or more catalytic beds; wherein reduction of the catalyst is carried out at a temperature of 450° C. to 550° C. in the presence of the recycling gas which has impurities in excess of 10% and contains hydrogen in an amount whereby the amount of pure hydrogen provided is between 1–10 kg/kg of catalyst.

2. A process according to claim 1, wherein the catalyst circulates in a moving bed.

3. A process according to claim 1, wherein the catalyst has a dwell time of 15 minutes to 2 hours in the reduction stage.

4. A process according to claim 1, wherein the process stage of treating the hydrocarbon fraction is carried out at 400–700° C., 0.1–4 MPa, with volumetric flow rates of 0.1–10 $h^{-1}$ and $(H2)_1$/HC molar ratios of at most 10.

5. A process according claim 1 comprising a reforming reaction carried out under 0.3–0.8 MPa, at 480–600° C., with volumetric flow rates of 1–4 $h^{-1}$ and with $(H2)_1$/HC ratios of at most 4 in the stage that implements the dehydrogenation.

6. A process according to claim 1, operating under 0.3–0.8 MPa, at 480–600° C., with volumetric flow rates of 1–4 $h^{-1}$ and $(H2)_1$/HC ratios of at most 6 in the stage that implements the dehydrogenation.

7. A process according to claim 1, wherein the recycling gas contains more than 10% by volume of C2+ impurities.

8. A process according to claim 1, wherein at least a portion of the gas effluent obtained from the reduction is introduced into the stage that implements the dehydrogenation and/or at least one stage is introduced following the dehydrogenation.

9. A process according to claim 8, wherein recycling gas is added in said at least one stage following the dehydrogenation.

* * * * *